M. E. LAYNE.

WELL MECHANISM.

APPLICATION FILED MAY 17, 1912.

Reissued Sept. 24, 1912.

13,467.

2 SHEETS—SHEET 1.

WITNESSES:

Julian H. Kindig

Ashworth Martin

Mahlon E. Layne INVENTOR.

BY Paul Synnestvedt

ATTORNEY

M. E. LAYNE.

WELL MECHANISM.

APPLICATION FILED MAY 17, 1912.

Reissued Sept. 24, 1912.

13,467.

2 SHEETS—SHEET 2.

WITNESSES:

Julian H Hendig

Archworth Martin

Mahlon E. Layne INVENTOR

BY

Paul Synnestvedt

ATTORNEY

UNITED STATES PATENT OFFICE.

MAHLON E. LAYNE, OF HOUSTON, TEXAS.

WELL MECHANISM.

13,467. Specification of Reissued Letters Patent. Reissued Sept. 24, 1912.

Original No. 957,974, dated May 17, 1910, Serial No. 378,342. Application for reissue filed May 17, 1912. Serial No. 698,083.

*To all whom it may concern:*

Be it known that I, MAHLON E. LAYNE, a citizen of the United States, residing at Houston, in the county of Harris and State of Texas, have invented certain new and useful Improvements in Well Mechanism, of which the following is a specification.

My invention relates to apparatus for drawing water from wells, and particularly to that type of well mechanism wherein a pump located beneath the surface of the ground and driven by a vertical shaft, is employed. The invention has for its objects; to provide an apparatus having a simple and reliable arrangement of parts for securing the exclusion of dirt and moisture from the interior of the shaft casing; to provide an effective means for securing the proper lubrication and cooling of all the shaft bearings; to provide an improved means for securing the alinement of the shafting and shaft casing; to provide a durable and inexpensive form of shaft guide adapted to be securely supported at the coupling for the shaft casing sections; and to provide an improved form of spider for holding the shaft casing in proper position with respect to the discharge casing and an improved form of main bearing. These and other objects are accomplished by my apparatus, one form of which is illustrated in the accompanying drawings, wherein—

Figure 1:
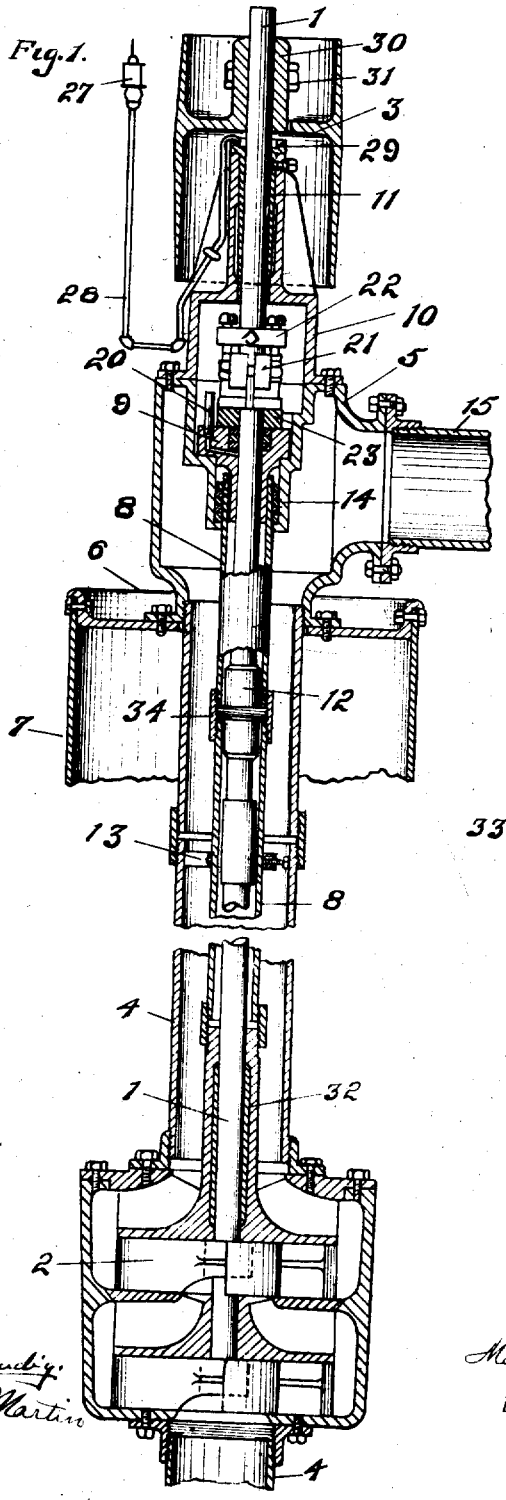
Figure 2:
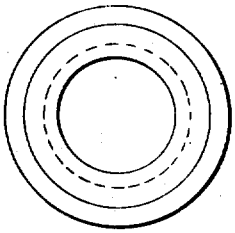
Figure 3:
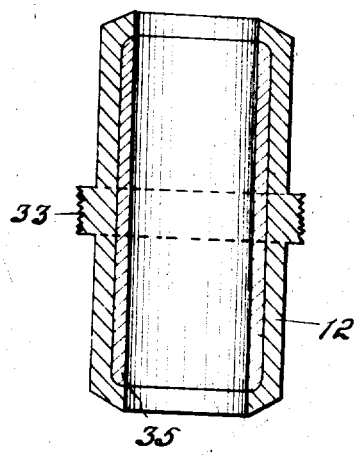
Figure 4:
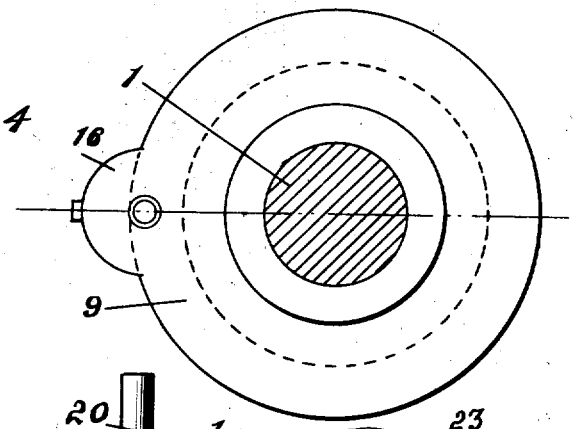
Figure 5:
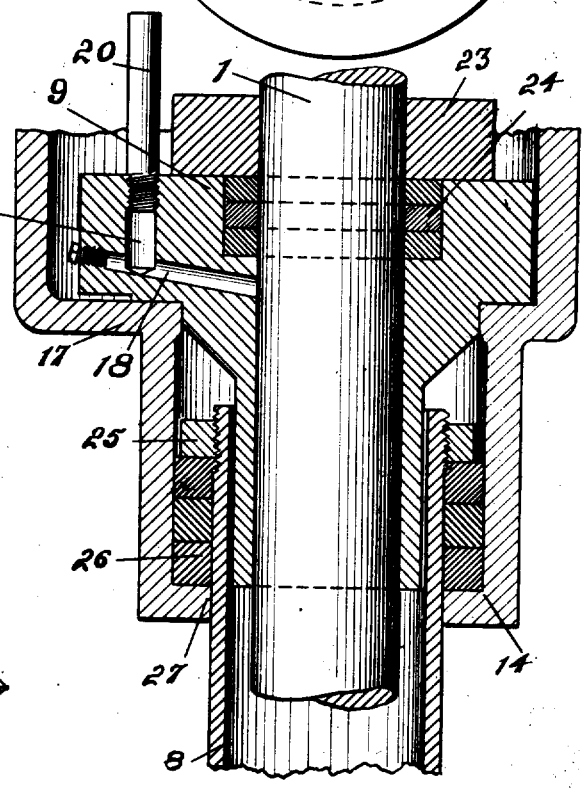
Figure 6:
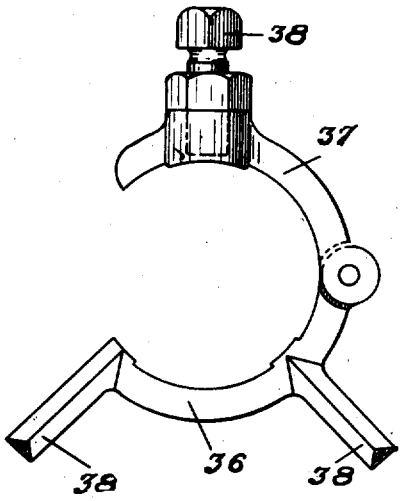

Figure 1 is a longitudinal section through the apparatus; Figs. 2 and 3 are enlarged detailed views of the shaft guide, Fig. 2 being an end view and Fig. 3 a longitudinal section; Fig. 4 is a plan view of the bearing block; Fig. 5 is an enlarged longitudinal section through the outlet casing and main bearing block, and Fig. 6 is a plan view of the spider.

Referring first to the general arrangement of parts as shown in Figure 1, 1 is the drive shaft carrying at its lower end centrifugal pump runners 2 which may be of any desired type, $2^2$ and $2^3$ are respectively what may be termed the outer casing member of the pump and the inner casing member of the pump, such members being rigidly secured in fixed relation to each other in the usual way, 3 is the drive pulley clamped to the end of the drive shaft 1, 4 is the discharge casing in which the pump is located and which conducts the water to the laterally opening outlet casing 5, 6 is the plate at the upper end of the steel pit 7, which plate supports the weight of the outlet casing and that of the parts carried thereby, 8 is the shaft casing which separates the shafting and bearings from the water in the discharge casing 4, 9 is the bearing block which takes the longitudinal thrust on the drive shaft 1, and also supports such shaft laterally, 10 is the cap for the outlet casing 5, which cap has a bearing 11 for supporting the upper end of the drive shaft 1, 12 is a shaft guide secured at the coupling in a manner hereinafter to be described, and 13 is a spider for supporting the shaft casing centrally with respect to the discharge casing.

One of the important features of my invention resides in the outlet casing 5, and the bearing block 9 seated therein, and the other immediate co-acting members, a part of which construction is shown in detail in Figures 4 and 5. As the bearing block 9 serves not only as a lateral bearing for the shaft 1, but also takes the thrust of the shaft, it is necessary that it be thoroughly cooled, and to this end the bearing block is seated in a downwardly extending socket or recess 14, which socket is made part of the outlet casing 5, and during the operation of the pump is kept constantly surrounded by water from the discharge casing which discharges laterally through the pipe 15. The bearing block 9 has, as will be seen by reference to Fig. 4, a small projection 16 which fits in a corresponding recess in the socket 14 and prevents a rotative movement of the block, and is seated securely against vertical movement by virtue of the shoulder 17 on the socket. Small passages 18 and 19 are provided in the block for securing the lubrication of the vertical bearing surface of the block, and the lubrication of the thrust surfaces is insured by the upwardly extending tube 20, which causes the level of oil in the socket to rise above the thrust bearing surfaces before any discharge to the oil passages through the block. The thrust of the end of the shaft is taken by means of the split clamping member 21, which clamping member is reinforced by means of the collar 22 secured to the shaft by means of the set screws shown. A brass wearing plate 23 is interposed between the member 21 and the top of the bearing block 9, and any leakage of oil along the shaft 1 from the upper surface of the block 9 is avoided by means of the packing 24 inserted in a recess in the upper portion of said block 9. The upper end of the shaft casing 8 is secured to the lower end of the socket member 14 by means of the nut 25 engaging the screw threads on the end of such shaft casing. By means of this nut the shaft casing may be adjusted longitudinally, and the weight of such shaft casing 8 carried from the socket member 14, thus materially assisting in giving the shaft casing a true vertical alinement. The packing 26 interposed between the nut 25 and the inwardly projecting flange 27 on the lower end of the socket portion 14 provides a means for securely packing the joints between the parts and preventing the access of any moisture to the interior of the shaft casing. It will be seen from the foregoing that provision is made for the cooling of the bearing block 9 and the effective oiling of all the bearing parts both thrust and lateral, and that access of moisture to the shaft and bearing parts is prevented, and provision at the same time made for the alinement of the shaft casing 8.

Provision is made for oiling the various bearings by means of the oil cup 27 and pipe 28 leading to the top of the bearing 11, which bearing 11 is provided at its upper end with an annular recess 29 for receiving the oil. The oil is received in the recess 29 and gradually finds its way downward along the shaft 1 into the casing formed by the cap 10 and the socket 14, wherein a bath of oil is provided for the thrust bearing, and the excess carried through the pipe 8 to the other bearings lying along the lengths of the shaft 1. The pulley 3 constitutes a cap for the oil recess 29, and because of its overhang, the support of the bearing 11 is afforded in substantially the line of stress of the belt acting over the pulley 3. The pulley is clamped to the shaft by means of the movable member 30 which constitutes half of the hub, and is fastened to the other half by means of the transverse bolts 31.

The shafting is guided and supported intermediate the bearing block 9 and the bearing 32 immediately above the pump by means of one or more guide members 12. This guide member is provided intermediate its ends with a projecting annulus 33 (Figs. 2 and 3), which annulus is threaded and adapted to be engaged by the coupling member 34. The coupling member 34 thus performs the function of joining the two casing sections and holding securely in longitudinal position the guide member 12. This form of guide member is of cheap construction, and when in position, constitutes a very rigid and effective guide and support for the rotating shaft 1, thereby keeping such shaft properly positioned in the shaft casing. The interior of the guide member may be lined, if desired, with Babbit metal 35, or any similar composition. The shaft casing 8 is also supported at proper intervals throughout its length by means of spiders 13, which engage such shaft casing and the discharge casing 4. The spider is shown in detail in Fig. 6, and comprises two hinge members 36 and 37, the first of which is provided with a pair of radial arms 38 for engaging the interior of the discharge casing 4, while the other hinge section 37 is provided with a set screw 38 adapted to engage the discharge casing 4. To position the spider the hinge members are slipped over the casing 8 and down into the discharge casing 4, after which the set screw 38 is screwed outwardly until its head contacts with the inner surface of the discharge casing and the inner surface of the hinged members 36 and 37 engage and securely hold the shaft casing 8, the operation of the single member 38 accomplishing these two results.

Having thus described my invention and illustrated its use, what I claim as new and desire to secure by Letters Patent, is the following:

1. In combination with a centrifugal pump having inner and outer casing members, a discharge casing secured to and supporting the outer casing member, a laterally opening outlet casing thereon provided with a supporting socket, a shaft casing coupled to the socket portion and to the inner casing member, a drive shaft having a thrust bearing in the socket and extending through the shaft casing to the pump, and means for supporting the outlet casing.

2. In combination with a centrifugal pump having inner and outer casing members, a discharge casing secured to and supporting the outer casing member, a laterally opening outlet casing thereon provided with a supporting socket, a shaft casing coupled to the inner casing member and having an adjustable connection with the socket, a drive shaft having a thrust bearing in the socket and extending through the shaft casing to the pump, and means for supporting the outlet casing.

3. In combination with a centrifugal pump having inner and outer casing members, a laterally opening outlet casing provided with a supporting socket, a discharge casing secured to the outlet casing and to the outer casing member, a shaft casing coupled to the supporting socket and to the inner casing member, a drive shaft having a thrust bearing in the socket and extending through the shaft casing to the pump, and means for supporting the outlet casing.

4. In combination, a discharge casing, a laterally opening outlet casing thereon provided with a downwardly extending socket portion provided with an inwardly extending flange at its lower end, a shaft casing extending through the flange and threaded at its upper end, a nut engaging the thread end, packing between the flange and nut, a bearing block mounted in the socket portion, and means for supporting the outlet casing.

5. The combination with a discharge T having a downwardly extending socket portion, of a drive shaft extending through the socket portion and having a thrust bearing member, a bearing block mounted in the socket portion and constituting a journal for the shaft and a thrust bearing for opposing the thrust bearing member and having an oil passage extending from its upper surface to a point adjacent the journal surface, and an admission tube mounted in the upper end of the oil passage whereby the oil in the socket is maintained at a level above the thrust bearing.

6. The combination with a discharge T having a downwardly extending socket portion, of a drive shaft extending through the socket portion and having a thrust bearing member, a bearing block mounted in the socket portion and constituting a journal for the shaft and a thrust bearing for opposing the thrust bearing member and having an oil passage extending from its upper surface to a point adjacent the journal surface, packing means for the shaft adjacent the upper end of the bearing block, and an admission tube mounted in the upper end of the oil passage, whereby the oil in the socket is maintained at the level of the top of the tube.

7. The combination with a discharge casing, a shaft casing therein, and a drive shaft in the shaft casing, of a laterally opening outlet casing at the upper end of the discharge casing provided with a socket portion extending down into the body of the casing whereby such socket is surrounded by water during the discharge, a bearing for the shaft mounted in such socket, a cap secured to the outlet casing and provided with a bearing for the upper end of the drive shaft and a pulley mounted upon such shaft.

8. The combination with a discharge casing and a shaft casing, of a supporting spider comprising a pair of hinged members for encircling the shaft casing, one of which is provided with means for engaging the interior of the discharge casing, and the other of which is provided with a radially projecting set screw for engaging the interior of the discharge casing.

9. The combination with a discharge casing and a shaft casing, of a supporting spider comprising a pair of hinged members for encircling the shaft casing, one of which is provided with a pair of radial arms for engaging the interior of the discharge casing, and the other of which is provided with a radially projecting set screw for engaging the interior of the discharge casing.

10. In combination in a well mechanism, a well pit casing, a rotary pump in the well pit casing, a drive shaft therefor, substantially concentric shaft and discharge casings secured to the pump at their lower ends and supported from the well pit casing at their upper portions, and means whereby the shaft and discharge casings may be adjusted relatively in a vertical direction to place the shaft casing under tension and maintain it in vertical alinement.

11. In combination in well mechanism for use in a vertical pit, a rotary pump comprising a casing and blades or runners, a drive shaft carrying the said blades or runners of the pump and extending upward therefrom, shaft and discharge casings placed one inside the other and secured to the pump casing at their lower ends, the said shaft casing being sectional and provided with bearing means engaging the said shaft, supporting means for the upper ends of the two casings for maintaining them in relatively fixed positions during the operation of the mechanism, and means whereby the shaft and discharge casing may be adjusted relatively in a vertical direction to place the shaft casing under tension and maintain it in vertical alinement.

12. In combination, a pump, a drive shaft therefor, a series of bearings for the shaft, a shaft casing inclosing the shaft and supporting the bearings and preventing access of the fluid while being pumped to such shaft and bearings, and a discharge casing inclosing the shaft casing whereby the fluid from the pump is carried upward in contact with the exterior of the shaft casing.

In testimony whereof I have hereunto signed my name in the presence of the two subscribed witnesses.

MAHLON E. LAYNE.

Witnesses:
THOS. L. O'NEILL,
J. CURLEY.